United States Patent [19]
Halle

[11] Patent Number: 4,459,758
[45] Date of Patent: Jul. 17, 1984

[54] TOPOGRAPHICAL SURVEYING INSTRUMENT

[75] Inventor: Pascal Halle, St. Juery, France

[73] Assignee: Sarl: Infomain, Vals Les Bains, France

[21] Appl. No.: 365,915

[22] Filed: Apr. 6, 1982

[30] Foreign Application Priority Data

Apr. 7, 1981 [FR] France ................................ 81 06912

[51] Int. Cl.³ .......................... G01B 3/10; G01B 11/00
[52] U.S. Cl. ...................................... 33/274; 33/1 H; 33/275 R; 33/292; 33/299
[58] Field of Search .................... 33/274, 275 R, 299, 33/292, 288, 1 H, 286, 234

[56] References Cited

U.S. PATENT DOCUMENTS

| | | | |
|---|---|---|---|
| 1,441,153 | 1/1923 | Jefferson . | |
| 2,249,226 | 7/1941 | Peters | 33/288 |
| 2,877,555 | 3/1959 | Visockis | 33/275 R |
| 3,302,293 | 2/1967 | French | 33/274 |
| 4,274,203 | 6/1981 | Vasile | 33/274 X |

FOREIGN PATENT DOCUMENTS

| | | |
|---|---|---|
| 305050 | 10/1919 | Fed. Rep. of Germany . |
| 1081244 | 5/1960 | Fed. Rep. of Germany . |
| 368935 | 6/1963 | Switzerland . |
| 431911 | 7/1934 | United Kingdom . |

Primary Examiner—William D. Martin, Jr.
Attorney, Agent, or Firm—Weingarten, Schurgin, Gagnebin & Hayes

[57] ABSTRACT

The present invention relates to a topographical surveying instrument, comprising:
  a horizontal table bearing a shaft perpendicular to the plane of the table,
  a device adapted to rotate on the shaft and comprising:
  a generator of a light beam perpendicular to the axis of the shaft,
  a measuring tape unwindable parallel to the beam,
  a ruler for plotting on the table.

The invention is more particularly applicable to an apparatus for surveying conspicuous points inside premises.

16 Claims, 5 Drawing Figures

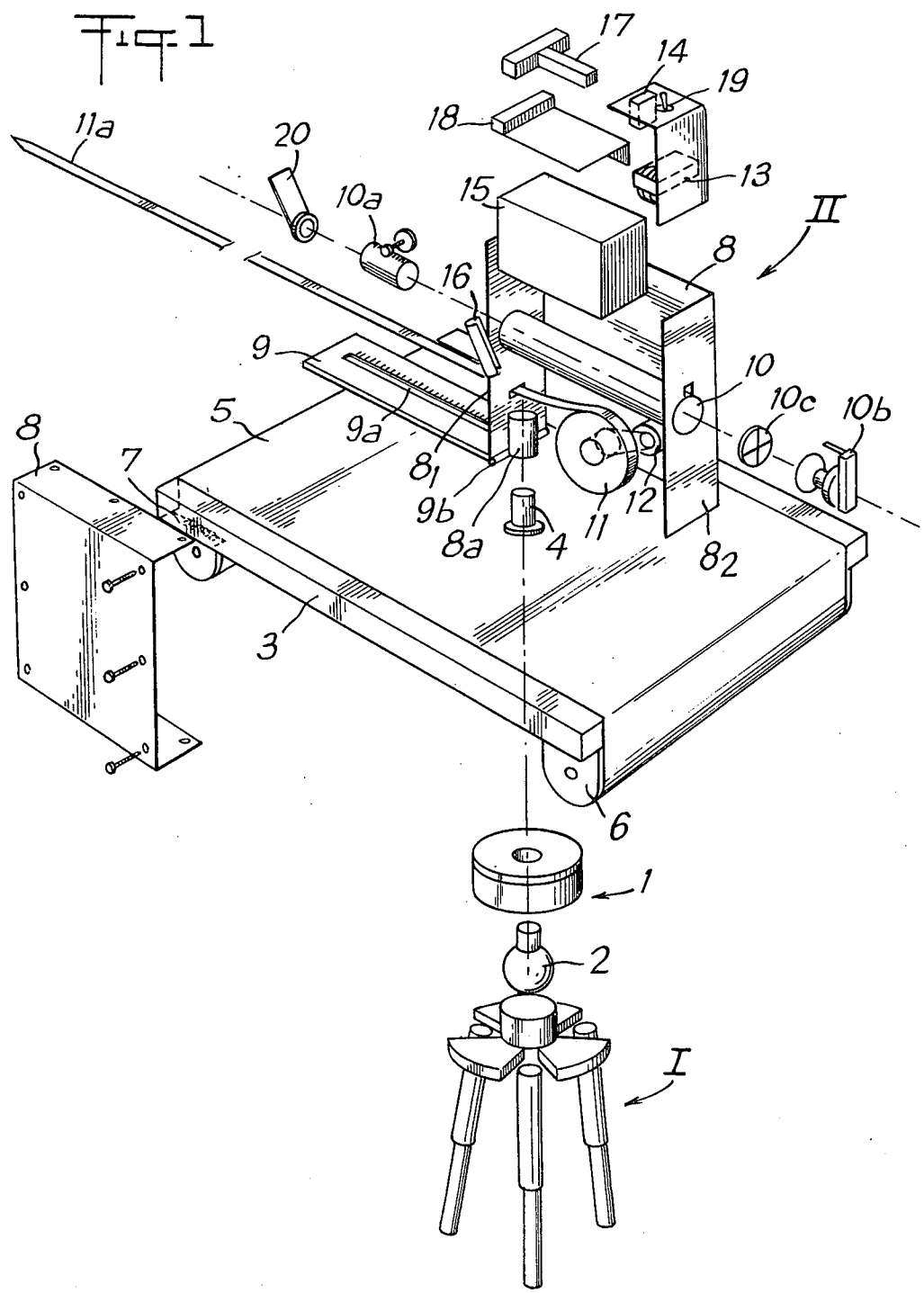

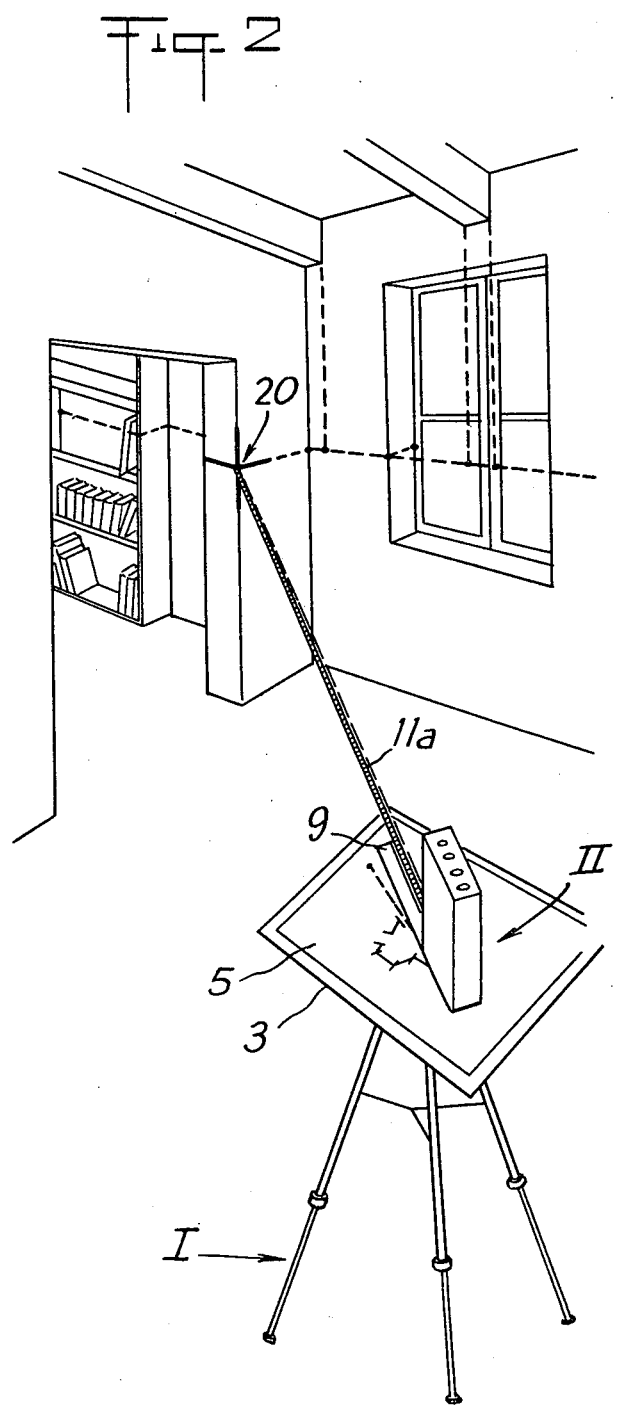

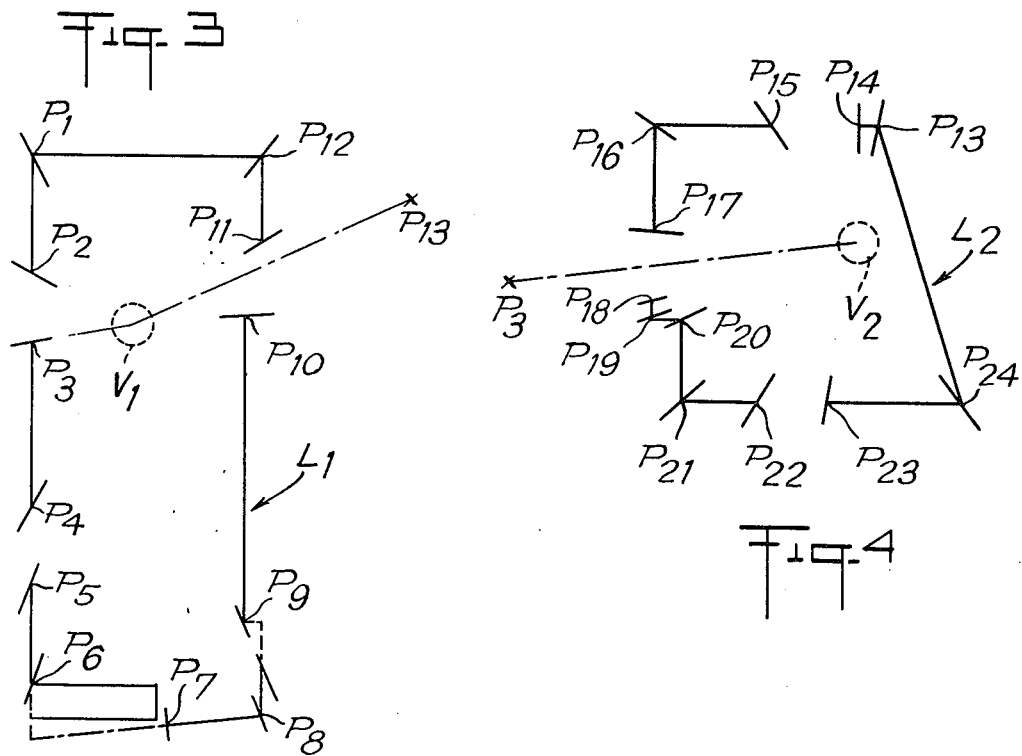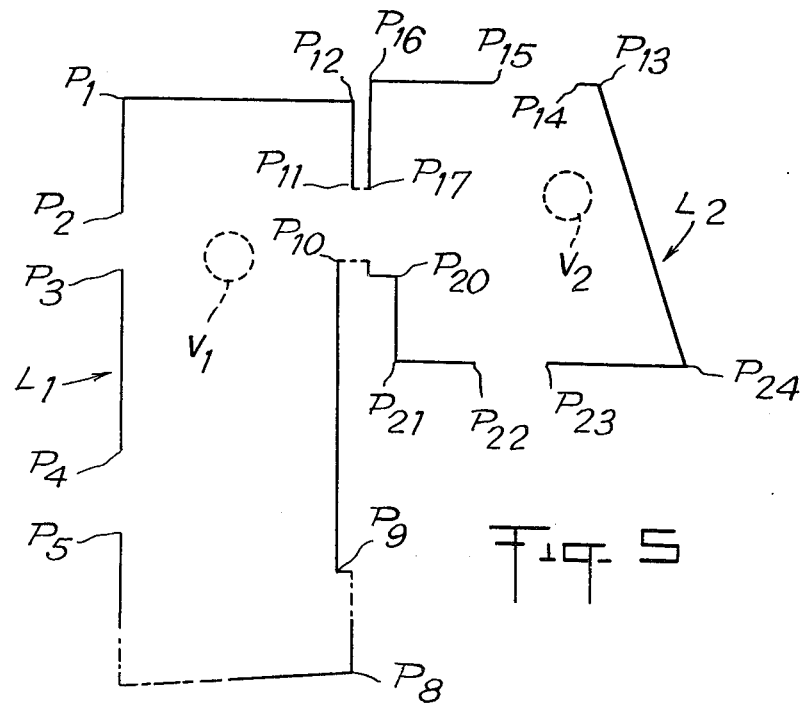

TOPOGRAPHICAL SURVEYING INSTRUMENT

The present invention relates to topographical surveying and plotting instruments.

Heretofore, contours have been plotted to a reduced scale in two phases. In the first phase, one proceeeds on site with a survey of elevations or dimensions of a series of landmarks of the surface or surrounding volume, which landmarks require measurements of length and triangulation or measurements of length and angles. In a second phase, these measurements are taken up, coordinated, reduced in a given ratio or reduction for the lengths, the angles being maintained the same, then transcribed point by point on a plotting support. It is not rare to observe, during this operation, that the gathering of the data proves insufficient and that it is necessary to return to the site to take further measurements necessary for faithfully plotting on the support.

The elevations of the landmarks are, in the majority of cases, surveyed by means of a linear measuring instrument which requires the presence of two operators.

Such an operation is therefore tedious, long and expensive.

In an attempt to overcome these drawbacks, it is proposed to use instruments such as an alidade or theodolite. These instruments, which are generally expensive, are delicate to use and, in particular, before being used, require a delicate phase of adjustment of perpendicularity with respect to a reference point included in their support polygon.

Furthermore, these instruments makes it possible, especially, to survey measurements of angles and are therefore poorly adapted to the measurement of elevations of landmarks, which does not allow sufficiently precise elevations to be obtained.

In addition, such apparatus are not suitable for surveying elevations inside various premises where the linear measurements to be recorded are, at the most, generally average, between zero and, most often, ten meters.

It is an object of the invention to solve the problem thus raised by proposing a novel topographical surveying and plotting apparatus which enables one operator to make a rapid, precise and reliable survey of the elevations of the landmarks of a surface or of a volume.

It is another object of the invention to propose a simple, strongly built, practical apparatus for surveying elevations of landmarks of surface or volume, even in poorly lit premises.

It is a further object of the invention to propose an apparatus which is entirely dismountable with a view to facilitating stowing away but also for easy transport thereof to the sites where it is used.

Yet another object of the invention is to offer an apparatus for surveying and plotting complex assembly plans by obtaining, from elementary surveys of surfaces or volumes, for example, the thickness of a wall or separating partition without having to resort to a separate measurement.

A further object of the invention is to provide an entirely independent apparatus which does not require in situ any energy for operation thereof.

To attain the above purpose, the topographical surveying apparatus according to the invention is characterised in that it comprises:

a tracing table adaptable to a support head and bearing a support shaft perpendicular to the plane of the table, a sighting, surveying and plotting device removably mounted to rotate on the shaft and comprising:

a generator of a light beam in a direction perpendicular to that of the shaft, a supple measuring tape associated with a winding drum and unwindable parallel to the direction of the beam, a ruler for plotting and tracing, superposed on the table and comprising a slot bordered by a graduated reduction scale and of which the longitudinal median axis, centered on the support shaft, is parallel to the direction of the beam.

The invention will be more readily understood on reading the following description with reference to the accompanying drawings, in which:

FIG. 1 shows an exploded view, in perspective, of the object of the invention.

FIG. 2 is a perspective view showing use of the object of the invention.

FIGS. 3 and 4 are diagrams corresponding to elementary survey plots obtained by using the apparatus.

FIG. 5 is a combined plan of the overall survey plot resulting from the association of the elementary survey-plots according to FIGS. 3 and 4.

Referring now to the drawings, FIG. 1 shows the apparatus of the invention, comprising, in one embodiment, an adjustable tripod 1 provided in its upper part with a support head 1. This head 1 may comprises a swivel joint 2 or a horizontally stable device with three points of adjustment.

A board 3, forming a tracing table, is fixed on the support head 1, particularly by a vertical shaft 4 perpendicular to the plane of the table and also serving to centre a plotting support 5, such as tracing paper. The support 5 may be a pre-cut out sheet or a web mounted on removable rollers 6 carried by the board 3 by means of a spring-loaded hinge 7.

The apparatus further comprises a sighting, surveying and plotting device II adapted to be mounted on the shaft 4 in order to be able to rotate freely, without direct abutment, on the support 5. To this end, the device II comprises a frame 8 constituted of one of more parts, in order to form a box both for supporting and protecting the technical means that it contains. The frame 8 comprises, as its base, a cylindrical bearing 8a or equivalent member adapted to cooperate with the shaft 4.

The front side $8_1$ of the frame bears a tracing-plotting ruler 9 provided with a slot 9a whose median longitudinal axis passes through the geometrical axis of the shaft 4. The slot 9a is bordered by at least one plotting and reduction scale. The ruler 9 extends horizontally, substantially in the plane of the base of the frame 8, so as to be placed as closely as possible to the board 3, but without physical contact therewith. According to a preferred embodiment, the ruler 9 is mounted on the frame by a horizontal pivot pin 9b which guides this ruler either below the frame 8 or in front of side $8_1$, to facilitate transport and stowing.

The frame 8 contains a tube 10 of horizontal axis perpendicular to shaft 4. The tube 10 is furthermore mounted on the frame so that the extension of its axis is contained in a vertical plane passing through the longitudinal median axis of the slot in the ruler 9. The tube 10 is adapted to support an optical assembly 10a associated with a system for adjusting the lens, for example by rack and pinion. The assembly 10a is adapted to be removably mounted in the tube 10, at the front side 8₁ of the frame. The tube 10 is designed to allow removable assembly, at the rear side 8₂ of the frame, of a lamp unit 10b with condenser mirror. When the lamp unit is supplied electrically, the tube 10, the assembly 10a and the unit 10b are intended to produce a light beam which enables a given image to be obtained on a support receiving said beam. This image is preferably that of a cross with four arms, obtained in the present case by interposition between the assembly 10a and the lamp 10b of a disc 10c defining a cruciform sight.

The frame 8 also supports a drum or pulley 11 for storing a linear measuring tape 11a which may be unwound, through a window in the front side 8₁, in a horizontal direction parallel to the axis of the tube 10. The drum 11 is preferably associated with an electric motor 12 for re-winding the tape 11a. The drum 11 is also associated with a progressively acting device for braking the advance, which may be neutralised manually or automatically in combination with the motor 12.

The frame 8 also supports a charger-rectifier 13, associated with a base 14 for adaptation of a supply cord, as well as a rechargeable battery 15. The frame further comprises a system 16 for illuminating the support 5 and/or the ruler 9, a system 17 for adjusting the level in two orthogonal directions and a system 18 for blocking the folded ruler 9.

A means 19 for controlliong supply of the lamp unit 10b and the motor 12 is provided on the top of the frame.

The device 11 is further completed by a mirror 20 mounted on a horizontal pin located below the outlet orifice of the tube 10, opposite which said mirror may thus be raised manually. The mirror 20 may be removably mounted on the front side 8₁.

The above-described apparatus is used as follows:

When elevations of conspicuous points in premises are to be surveyed, the apparatus is mounted as illustrated in FIG. 2. The board 3 is placed on the head of the tripod I and the device II, after opening of the ruler 9, is adapted on the shaft 4. Adjustment of perpendicularity is effected to ensure that the axis of tube 10 is horizontal.

Survey plots are made by the polar coordinates method, the survey-plot apparatus being placed in a position which enables the maximum of conspicuous points of the contour to be plotted to be optically sighted. After horizontality is obtained for the light beam, the lamp unit 10b is then switched on to emit the light beam which produces a cruciform image 20 on the plane of sight. This image 20 displays for the operator an aimed point of which the distance with respect to the front side 8₁ may be measured with precision by unwinding the tape 11a to bring its free end up to the point in question. The measurement is read level with the front side 8₁ and this measurement is then plotted on the support 5 by selecting the corresponding graduation of the reduction scale 9a; the tape 11a and the ruler are disposed or mounted to this end so that the origin coincides with the geometrical axis of the shaft 4. Plotting of the selected point is effected on the semi-axis traced from the ruler according to the orientation of sight.

In this way, the apparatus according to the invention makes it possible to eliminate the two successive phases of surveying an elevation then of subsequently plotting on a support, as in the present method. In fact, the mechanical connection established between the marking-measuring device and the plotting device eliminates the necessity of triangulation or of measurement of the angles. The constitution, seen by the operator, of the contour which he wishes to plot, eliminates any insufficient gathering of data. The powerful light beam used for marking has a horizontal axis. The rotation of this beam about a vertical axis describes a contour line on any obstacle encountered on its path and, in particular, the landmarks of the contour to be plotted. This property allows the contour to be taken in contour lines and, consequently, enables the possible defect of parallelism between the locus of the beam and any plane which would appear to be horizontal, to be assessed.

It is also possible to make survey-plots in encumbered volumes as long as certain conspicuous points can be directly sighted optically.

It is also possible to establish a spatial link between two survey-plots as long as they have two conspicuous points in common. This property is advantageously used to make a survey-ploy of complex assembly plans and to deduce therefrom certain properties of the volumes, for example. In this way, measurements of wall thicknesses or obstacles may be obtained by non-destructive methods, by connecting the contours of their different faces.

FIG. 3 shows by way of example the successive survey of conspicuous points $P_1 \ldots P_{12}$, made a surveyor's pole $V_1$, in twelve directions. The link between these points enables the plan of the corresponding premises $L_1$ to be plotted on the support.

When the recording of such premises represents only an elementary phase having to be completed by the plotting of the plan of adjoining premises, such as $L_2$ (FIG. 4), the location of the pole $V_1$ in the premises $L_1$ is chosen so that it can make a reference sight with a view to surveying the elevation of a point $P_{13}$ belonging to premises $L_2$.

The choice of location of the pole $V_2$, with a view to surveying premises $L_2$, is made in similar manner in order to be able to sight a point P of premises $L_1$. In the example illustrated, the reference sight from pole $V_2$ concerns point $P_3$.

It therefore becomes possible, by coinciding the reference points with the survey points, to associate, in their real relative position, the plans of premises $L_1$ and $L_2$. Such an assembly, as illustrated in FIG. 5, then allows the thickness of intermediate obstacles, such as walls as or partitions, to appear, without proceeding with a specific measurement or survey.

In this example, the conspicuous points of premises $L_2$ bear references $P_{13}$.

It has been specified hereinabove that the front side 8₁ may be equipped with a mirror 20. This mirror is mounted on the apparatus so that, when it is manoeuvred, it deflects only the upper arm of the vertical axis of the image of the cross, allowing not only the lower arm of this axis but also the horizontal axis to project on any obstacle placed on the path of the light beam emitted by the optical system.

The axis of rotation of the mirror being horizontal, the upper arm of the vertical axis of the image of the cross projects on any obstacle placed in the vertical plane containing the optical axis of the non-deflected beam.

This particular feature makes it possible to plot on the contour line any conspicuous point located in the vertical plane containing the optical axis of the linear beam leaving the optical marking system and consequently to take into account the possible presence of an obstacle in order nevertheless to determine the azimuthal direction of sight. Such a mirror also enables any conspicuous point located at a different level to be plotted by projection on the contour line.

According to a variant embodiment of the apparatus with greater automation, the removable shaft inserted in the tube rigidly connected to the tube bearing the optical marking system, is provided with a drive system which acts on the rotation of the "sight-surveying-plotting" device II with such a reduction that the operator may continuously follow, with the free end of the linear measuring means, the displacement of the light beam along the contour line.

According to another embodiment of the apparatus, the tape 11a is replaced by a wire unwinding from a drum equipped with a means for electrically measuring the advance, adapted to energize an electrical system for positioning a tracer pen for printing on the plotting support.

According to yet another embodiment of the apparatus, the plotting device is constituted by a guide element on which slides (by pinion-chain, screw-nut or pulley-belt transmission) an inker pen assembly which moves under the action of a motor energized by a translator, which is energized by an advance pulse counter. Printing of the support is effected by energization of an electromagnet fast with the inker pen, this energization being triggered off by pulse of electrical or ultra-sonic origin, from the relevant point of the contour to be plotted, this pulse being continuous or intermittent.

The apparatus according to the invention may thus be used for making, with high precision and considerable economy of means (absence of measurement of angular displacement), any survey or established fact for which the plotting of the survey in situ, virtually simultaneously to said survey, is an appreciable means of checking the work carried out.

The use of a beam of artificial light makes it possible to have access to the domain of surveys in premises with little or no natural illumination, said domain not being easily accessible to topographical apparatus with viewfinders or sighting pieces. The object of the invention further enables comparisons of direction with respect to a horizontal plane (checking of level) or a vertical plane (checking of perpendicularity) to be made.

Particularly advantageous applications may be made to the domain of surveying buildings or monuments and in particular in the restoration of dwellings.

FIG. 1 shows that the rechargeable battery is placed in the frame near the front side $8_1$, in order to be substantially centered with respect to axis 4. With a view to opposing the reaction of braking upon unwinding of the tape 11a, it may be provided to place the battery 15 near the rear side $8_2$ so that it performs a function of balancing counterweight.

The invention is not limited to the embodiments which have been described and shown, as various modifications may be made thereto without departing from the scope thereof.

What is claimed is:

1. Apparatus for providing topographical surveys, comprising:
   a tracing table having a generally planar surface;
   a sight, survey, and plotting device having a frame;
   means for rotatably mounting said sight, survey, and plotting device to said tracing table about an axis of rotation perpendicular to the generally planar surface of the tracing table;
   means mounted to said frame for providing a light beam in a direction generally perpendicular to said axis;
   a winding drum;
   means for mounting said winding drum to said frame;
   a supple measuring tape associated with said winding drum and unwindable parallel to the direction of said beam and perpendicular to said axis of rotation;
   a plotting and tracing ruler having a slot and a graduated reduction scale proximate said slot defining a longitudinal median axis; and
   means for mounting said plotting and tracing ruler to said frame such that said longitudinal median axis is perpendicular to said axis of rotation and extends over the tracing table in a direction parallel to the direction of said light beam.

2. The invention of claim 1, further including a plotting support disposed on said table.

3. The invention of claim 2, wherein said plotting support is a precut sheet.

4. The invention of claim 2, wherein said plotting support includes a web, and means for mounting said tracing table.

5. The invention of claim 4 wherein said web mounting means includes roller removably fastened to said tracing table.

6. The invention of claim 1, wherein said light beam providing means includes a generator of a light beam that produces a curciform image.

7. The invention of claim 1, wherein said light beam providing means includes a generator of a light beam and a mirror associated with said generator for a least partially deflecting said light beam.

8. The invention of claim 6, wherein said light beam providing means includes a generator of a light beam and a mirror associated with said generator for at least partially deflecting said light beam.

9. The invention of claim 1, wherein said winding drum mounting means includes an advance brake and a winding motor.

10. The invention of claim 1, wherein said plotting and tracing ruler is pivotally mounted to said frame.

11. The invention of claim 10, further including an inker pen and means for moving the inker pen automatically parallel to said slot.

12. The invention of claim 1, wherein said light beam providing means includes a rechargeable battery mounted to said frame.

13. The invention of claim 10, wherein said light beam providing means includes a rechargeable battery mounted to said frame.

14. The invention of claim 12, wherein said rotatably mounting means includes a support shaft and a bearing, and wherein said rechargeable battery is so mounted to said frame as to be offset with respect to said support shaft so as to constitute a balancing counterweight.

15. The invention of claim 13, wherein said rotatably mounting means includes a bearing and a support shaft, and wherein said rechargeable battery is so mounted to said frame as to be offset with respect to said support shaft so as to constitute a balancing counterweight.

16. The invention of claim 1, wherein said rotatably mounting means includes a gear-down motor.

* * * * *

UNITED STATES PATENT AND TRADEMARK OFFICE
CERTIFICATE OF CORRECTION

PATENT NO. : 4,459,758
DATED : July 17, 1984
INVENTOR(S) : Pascal Halle

It is certified that error appears in the above—identified patent and that said Letters Patent is hereby corrected as shown below:

Column 1, line 7, "In the first phase," should read --In a first phase,--;

line 13, "ratio or reduction" should read --ratio of reduction--;

line 33, "these instruments makes" should read --these instruments make--.

Column 2, line 30, "tripod 1 provided" should read --tripod I provided--;

line 67, "supportan" should read --support an--.

Column 3, line 32, "device 11" should read --device II--;

line 29, "controlliong" should read --controlling--.

Column 4, line 20, "survey-ploy" should read --survey-plot--;

line 27, "made a surveyor's" should read --made from a surveyor's--;

line 48, "walls as or partitions" should read --walls or partitions--.

UNITED STATES PATENT AND TRADEMARK OFFICE
CERTIFICATE OF CORRECTION

PATENT NO. : 4,459,758
DATED : July 17, 1984
INVENTOR(S) : Pascal Halle

It is certified that error appears in the above—identified patent and that said Letters Patent is hereby corrected as shown below:

Column 5, line 6, "Accordingto" should read --According to--.

Column 6, line 21, "said table." should read --said tracing table.--;

lines 25-26, "mounting said tracing table." should read --mounting said web to said tracing table.--;

line 28, "roller" should read --rollers--;

line 32, "curciform" should read --cruciform--;

line 35, "for a least" should read --for at least--;

line 52, "claim 10," should read --claim 9,--.

Signed and Sealed this

Twenty-sixth Day of March 1985

[SEAL]

Attest:

DONALD J. QUIGG

Attesting Officer    Acting Commissioner of Patents and Trademarks